Patented July 26, 1932

1,869,272

UNITED STATES PATENT OFFICE

BEVERLY OBER AND EDWARD H. WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

METHOD OF PREPARING AND AMMONIATING ACID PHOSPHATE

No Drawing.   Application filed April 19, 1927. Serial No. 185,066.

This invention relates to an improved treatment of phosphate fertilizer.

Commercial acid phosphate and double superphosphates are usually prepared by treating ground phosphate rock, or similar phosphatic material, with sulphuric acid or phosphoric acid. In carrying out the process the rock is ground and mixed with the acid for a relatively short period in an open mixing pan. After the brief agitating step, the charges from the mixer are dumped, one upon another, in a large den. In this den the reactions which were begun in the mixing pan continue and form, as is known, the solid end products of agricultural available phosphate salts. During this period the mass sets up as a spongy, porous product. Although this material has an appreciable percentage of soluble phosphate, it is not at this stage in proper physical condition for grinding and bagging, since there is present excess water and acid.

At the present it is the practice to remove excess acid by dusting with absorbents, such as raw phosphate rock and lime, and to store the material for extended periods to permit the evaporation of the uncombined water. Such methods involved expensive rehandling of the material and protracted curing periods.

It is an object of this invention to provide a process for manufacturing phosphate fertilizer by which an acid free product may be obtained without rehandling the material.

Another object is to provide a process for manufacturing a phosphate fertilizer by which the steps of mixing, digesting, drying and eliminating free acid and uncombined water is carried out in a single container.

Another object is to provide a process for making phosphate fertilizer by which a substantially acid free and dry product may be obtained without requiring an extended curing period.

Yet another is to provide a process for the production of available phosphates which may be carried out in a minimum of apparatus.

With these and other important objects in view, our invention comprises a special treatment for phosphatic raw material and a reagent to produce available phosphates and the subsequent introduction of a substance to take up the free acid in the mass.

In carrying out our process, measured quantities of phosphate rock, or equivalent material, and an acid are admitted to an autoclave. In this container the pressure and temperature conditions are so controlled as to maintain the mass in a mixable condition for a determinative period of time, as described in detail in our co-pending application Serial No. 179,706, filed March 30, 1927.

As explained in the application above referred to, the acid and rock are admitted to the autoclave which is opened for this purpose. The rock and acid may be separately or simultaneously introduced either under gravity or applied pressure. After admission of the materials, the container is sealed to prevent access of air and to retain generated gases of reaction. By sealing the container and imposing pressures, we are enabled to maintain concentrations of the original elements of the mass and by retarding its reactivity to prevent the formation of the solid end products. In this manner the material is kept in a mixable condition and intimate mixture of the acid and rock dust is obtained.

After the materials have been agitated and thoroughly mixed, the conditions within the container may be adjusted to permit the completion of those reactions which result in the desired end products. To do this, the temperature in the container is raised by admitting a heating medium to the thermal jacket of the autoclave. The increase in temperature overcomes the retarding effect exerted by the increased pressure and permits conversion of the insoluble phosphate to the available form.

After the materials have been allowed to react at elevated temperatures for a period sufficient to permit conversion, the pressure in the container may be released. As explained in the co-pending application, this may be done by operating a relief valve appropriately positioned on the autoclave. Upon release of the pressure there is a sudden drop in pressure and an exit of gases.

The release of pressure is attended by a drop in temperature which serves to crystallize the mass. As is well known, the end products, such as mono and di-calcium phosphate and calcium sulphate, take up a considerable quantity of water as water of crystallization.

After the release of pressure and the initial crystallization, the valve on the top of the autoclave may then be closed. In our co-pending application above referred to, there was described a process for drying the mass at this point. This method comprised setting up a reverse pressure or vacuum in the now closed container and withdrawing occluded moisture and gases from the autoclave. In our present method we propose to admit an extraneous medium, such as aqueous ammonia or preferably ammonia gas, which will take up or neutralize the free acid. To do this the autoclave may be connected, through one of its hollow shafts, to a tank in which is contained the aqueous ammonia or ammonia gas. This may be forced through the autoclave under pressure of a pump positioned in the inlet line. However, we may utilize the apparatus described in our former application and by operating the vacuum pump, positioned at the outlet vapor line of the autoclave, draw the ammonia gas through the container. During this period the autoclave may be continuously rotated to insure contact of the gas with the autoclave product.

It will be observed that instead of drawing the ammonia in a continuous stream through the autoclave we may admit a predetermined amount of this gas and by rotating the autoclave insure its contact with the free acid occluded in the product.

After a brief treatment with the neutralizing medium the intake line from the source of gas may be closed and the residual gas evacuated from the autoclave by the operation of the vacuum pump. It is to be understood that the vacuum line may be provided with a by-pass at the discharge side of the vacuum pump which is connected to the ammonia gas tank; thus when the neutralizing medium is to be admitted to the autoclave it may be pumped from the holding tank through the autoclave and recycled back to the tank. After the free acidity has been taken up, the inlet and outlet lines to the ammonia tank may be closed by a suitable valve and the residual gas drawn from the autoclave and discharged to the atmosphere, or to a tank containing an absorbent for the ammonia. It will be appreciated that this tank may be interposed between the autoclave and the vacuum pump so that the excess ammonia from the autoclave may be taken up in the absorbent from which it may be recovered for reuse or sale.

It will be appreciated that evacuation treatment serves not only to withdraw the residual ammonia but also assists in removing a considerable quantity of water from the mass. When the ammonia reacts with the free phosphoric or sulphuric acid ammonium phosphate or ammonium sulphate is formed. These reactions are exothermic and increase the temperature of the material in the autoclave. This rise in temperature tends to vaporize the uncombined water retained in the product and facilitates subsequent removal when the vacuum pump is operated.

The evacuation treatment may be continued for any desired period of time. As has been explained the evacuation treatment serves the dual function of eliminating ammonia and withdrawing excess water from the product. On its completion the autoclave is opened and the product removed. This product contains but a slight quantity of water, which will vary depending with the extent of the evacuation period, and no free acid. The material may then be disintegrated in a grinding machine and bagged. As has been explained, this contains a high percentage of available phosphate and some ammonium salts having fertilizer values. Since the product contains no free acid and very little moisture, it may be immediately bagged and is then ready for shipment.

It is to be understood that the neutralizing medium may be admitted to the autoclave at any time prior to the removal of the product. If desired, it may be run in after the mass has been dried by the evacuation treatment. As has been pointed out, the purpose of this step is to kill the free acidity of the converted material and hence the neutralizing agent may be admitted at any stage of the treatment where this may effectively be done.

It will now be seen that we have provided a process for the manufacture of a fertilizer which, if desired, may be carried out in a single container. In this container the separate steps may be effectuated since, as has been described, the mixing, conversion, neutralizing and drying steps may be carried out therein. By regulating the mixing period as described, we are enabled to secure efficient utilization of acid. By the subsequent neutralization treatment we eliminate free acid in the mass and are able to withdraw from the container a product which can be immediately prepared for shipment. In this manner we eliminate the expensive drying and curing processes which have heretofore been found necessary.

We have described the use of ammonia gas as the preferable neutralizing agent because of its ideal applicability to the process and apparatus as described in the copending application above referred to. It is to be understood, however, that the invention resides in a broad concept of treating prepared acid phosphate or double super phosphate with an agent which contains a material which will react to neutralize the free acid. Either aqueous ammonia or gaseous ammonia are well suited for this purpose, inasmuch as they are commercially available and increase the fertilizer value of the product in addition to the fact that they combine exothermically with the material to be treated. It will readily be appreciated, however, that other forms of neutralizing agents may be admitted to the autoclave and mixed with the product therein.

While we have described a particular process and apparatus by which the fundamental principles of our invention may be effectuated, it is to be understood that this is merely for the purpose of more clearly explaining these principles and hence we do not intend to be restricted to a particular succession of steps or ingredients except as clearly limited thereto by the appended claims.

We claim:

1. A process of manufacturing phosphate fertilizers comprising mixing ground phosphate rock and sulphuric acid, digesting the mixture, while mechanically agitating it in a confined space under autogenous superatmospheric pressure and applied superatmospheric temperature for a period of time sufficient to effect a substantial conversion of the unavailable phosphates to available phosphates, relieving the pressure in said confined space, applying a reduced pressure to the material in said space to facilitate drying of the product and to render the same more receptive for ammonia and subsequently introducing ammonia into the said space while maintained under a reduced pressure.

2. A process of manufacturing phosphate fertilizers comprising mixing ground phosphate rock and sulphuric acid, digesting the mixture while mechanically agitating it in a confined space under autogenous superatmospheric pressure and applied superatmospheric temperature for a period of time sufficient to effect a substantial conversion of the unavailable phosphates to available phosphates, relieving the pressure in said confined space to effect crystallization and drying of the reaction product, further reducing the pressure to complete the crystallization and drying and to produce a partial vacuum in the pores of the reaction product and admitting ammonia to the confined space while maintained under a reduced pressure.

3. A process of manufacturing superphosphate comprising mixing predetermined quantities of finely ground phosphate rock and strong sulphuric acid, then passing the unset mixture to a confined space, digesting the mass, while mechanically agitating, under autogenous superatmospheric pressures and maintaining the mass at elevated temperatures during the digestion by applying extraneous heat, continuing the digestion for a period of time sufficient to effect a substantial conversion of the unavailable phosphate to available forms, relieving the pressure in said confined space, applying a reduced pressure to the material in said space, to facilitate drying of the product and to render the same more receptive for ammonia and subsequently introducing ammonia into the said space while maintained under a reduced pressure.

4. A process of manufacturing superphosphate comprising mixing predetermined quantities of finely ground phosphate rock and strong sulphuric acid, then passing the unset mixture to a confined space, digesting the mass while mechanically agitating, under autogenous superatmospheric pressures and maintaining the mass at elevated temperatures during the digestion by applying extraneous heat, continuing the digestion for a period of time sufficient to effect a substantial conversion of the unavailable phosphate to available forms, relieving the pressure in said confined space to effect crystallization and drying of the reaction product, further reducing the pressure to complete the crystallization and drying and to produce a partial vacuum in the pores of the reaction product and admitting ammonia to the confined space while maintained under a reduced pressure.

5. A process of manufacturing phosphate fertilizers comprising mixing ground phosphate rock and sulphuric acid, digesting the mixture, while mechanically agitating it in a confined space under autogenous superatmospheric pressure and applied superatmospheric temperature for a period of time sufficient to effect a substantial conversion of the unavailable phosphates to available phosphates, relieving the pressure in said confined space, applying a reduced pressure to the material in said space to facilitate drying of the product to render the same more receptive for ammonia and subsequently introducing ammonia into the said space while maintained under a reduced pressure and while agitating the mass in said confined space.

6. A process of manufacturing phosphate fertilizers comprising mixing ground phosphate rock and sulphuric acid, digesting the mixture while mechanically agitating it in a confined space under autogenous superatmospheric pressure and applied superatmospheric temperature for a period of time sufficient to effect a substantial conversion of the unavailable phosphates to available phosphates, relieving the pressure in said confined space to effect crystallization and drying of the reaction product, further reducing the pressure to complete the crystallization and drying and to produce a partial vacuum in the pores of the reaction product and admitting ammonia to the confined space while maintained under a reduced pressure and while agitating the mass in said confined space.

7. A process of manufacturing phosphate fertilizers comprising mixing ground phosphate rock and sulphuric acid, digesting the mixture, while mechanically agitating it in a confined space under autogenous superatmospheric pressure and applied superatmospheric temperature for a period of time sufficient to effect a substantial conversion of the unavailable phosphates to available phosphates, relieving the pressure in said confined space to effect crystallization and drying of the reaction product, further reducing the pressure to complete the crystallization and drying and to produce a partial vacuum in the pores of the reaction product and admitting ammonia to the confined space while maintained under a reduced pressure and subsequently withdrawing excess ammonia from said confined space.

8. A method of treating acid phosphate fertilizer to incorporate nitrogen values therein comprising subjecting a mass of the acid phosphate fertilizer to a reduced pressure in a confined space to render the material more receptive to the action of ammonia, and introducing ammonia into said confined space while under reduced pressure.

9. A method of treating acid phosphate fertilizer to incorporate nitrogen values therein comprising subjecting a mass of the acid phosphate fertilizer to a reduced pressure in a confined space to render the material more receptive to the action of ammonia, and introducing ammonia into said confined space while under reduced pressure, and agitating the mass while under reduced pressure and while being subjected to the action of ammonia.

10. A method of treating acid phosphate fertilizer to incorporate nitrogen values therein comprising subjecting a mass of the acid phosphate fertilizer to a reduced pressure in a confined space to render the material more receptive to the action of ammonia, and introducing ammonia into said confined space while under reduced pressure and subsequently withdrawing excess ammonia from the confined space.

In testimony whereof we affix our signatures.

BEVERLY OBER.
EDWARD H. WIGHT.